US007964987B2

(12) United States Patent
Isobe et al.

(10) Patent No.: US 7,964,987 B2
(45) Date of Patent: Jun. 21, 2011

(54) LIGHT EMITTING APPARATUS

(75) Inventors: Kouichi Isobe, Shizuoka (JP); Yasushi Noyori, Shizuoka (JP); Fuminori Shiotsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 547 days.

(21) Appl. No.: 12/057,622

(22) Filed: Mar. 28, 2008

(65) Prior Publication Data
US 2008/0238344 A1 Oct. 2, 2008

(30) Foreign Application Priority Data
Mar. 29, 2007 (JP) ................. 2007-088256

(51) Int. Cl.
*B60L 1/14* (2006.01)
(52) U.S. Cl. ........................ 307/10.8; 361/42
(58) Field of Classification Search .......... 315/77, 315/82, 185 R, 186, 185 S, 209 R, 210, 291, 315/312, 313, 362; 307/10.1, 10.8; 361/42, 361/45, 49
See application file for complete search history.

(56) References Cited

U.S. PATENT DOCUMENTS

| | | | | |
|---|---|---|---|---|
| 6,844,681 B2 * | 1/2005 | Serizawa et al. | ............... | 315/77 |
| 7,479,743 B2 * | 1/2009 | Namba et al. | ................. | 315/307 |
| 7,528,553 B2 * | 5/2009 | Ito et al. | ........................ | 315/291 |
| 7,638,947 B2 * | 12/2009 | Ito et al. | ......................... | 315/77 |
| 7,663,323 B2 * | 2/2010 | Telefont | ....................... | 315/291 |
| 7,667,414 B2 * | 2/2010 | Fujino et al. | .................. | 315/307 |
| 2002/0047593 A1 * | 4/2002 | Guthrie et al. | ............ | 315/185 R |
| 2008/0037262 A1 * | 2/2008 | Wesson | ......................... | 362/362 |

FOREIGN PATENT DOCUMENTS
JP 2004-134147 4/2004
* cited by examiner

*Primary Examiner* — Thuy Vinh Tran
(74) *Attorney, Agent, or Firm* — Fish & Richardson P.C.

(57) ABSTRACT

A light emitting apparatus includes a light source block with semiconductor light sources connected in series to each other. A resistor is connected in parallel with one or more of the semiconductor light sources and is connected to two detecting target portions in portions linked to respective electrodes of the semiconductor light sources. A ground fault detecting circuit is connected to one of the two detecting target portions disposed on a ground potential side. The light source block has one of its terminals connected to a power supply and its other terminal grounded. By detecting a change in the voltage through the ground fault detecting circuit, a ground fault can be detected.

3 Claims, 5 Drawing Sheets

FIG. 3
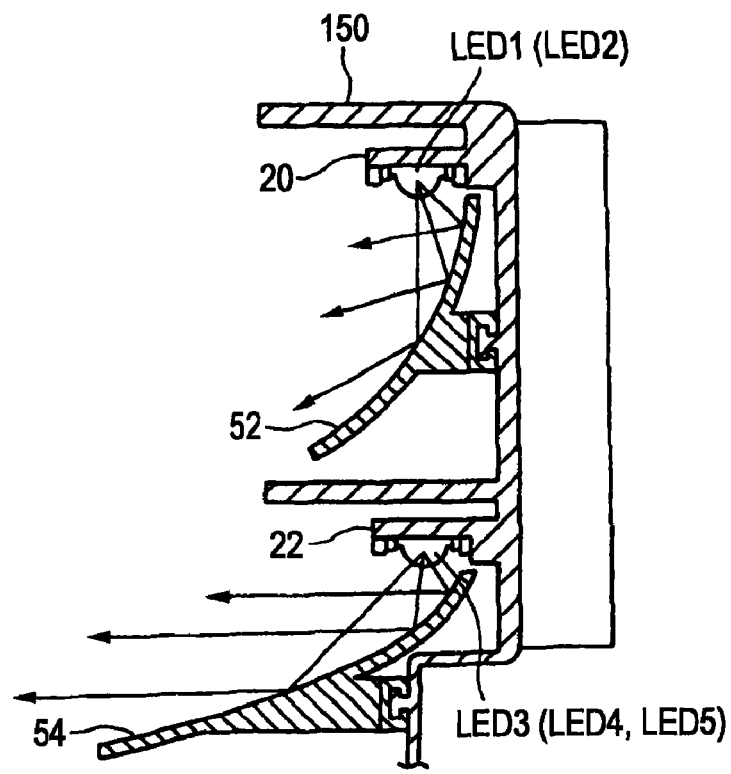
FIG. 4 (a)  V2
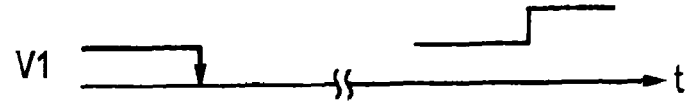
FIG. 4 (b)  V1
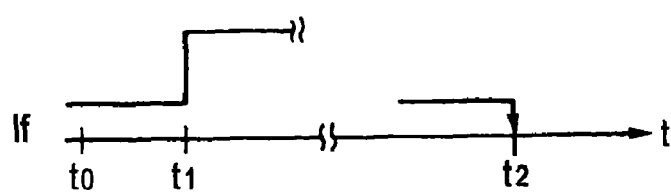
FIG. 4 (c)  If

LIGHT EMITTING APPARATUS

TECHNICAL FIELD

The present disclosure relates to a light emitting apparatus and more particularly to a light emitting apparatus for a vehicle that includes a semiconductor light emitting device. The disclosure also relates to a lighting circuit for turning ON the semiconductor light emitting device.

BACKGROUND

In a lighting device for a vehicle, a semiconductor light emitting device such as an LED (Light Emitting Diode) is used for a light source. A lighting control circuit for controlling operation of the LED is mounted on the lighting device for a vehicle of this type.

Some lighting control circuits use a switching regulator to control an output voltage for the LED based on the current of the LED. The switching regulator controls the output voltage so as to cause a specified current to flow to each LED regardless of whether the LEDs are connected in series to, or in parallel with, the switching regulator.

In some cases in which an output of the switching regulator is short-circuited or grounded, however, a load of the switching regulator is increased so that a failure is caused with an excessive power burden. Referring to a switching regulator of a flyback type, for example, in some cases in which the output of the switching regulator is opened as the result of a disconnection, an output voltage becomes too high.

Therefore, it has been proposed that the output voltage of the switching regulator be dropped when an abnormality on the output side of the switching regulator is detected (see, e.g., Japanese Patent Document JP-A-2004-134147).

When the output terminal of the switching regulator generates a ground fault, the abnormality is generated on the output side of the switching regulator. Even if the ground fault is generated in any of the portions between the LEDs, however, the ground fault cannot be detected.

More specifically, is has been suggested to set a whole LED block as a load of the switching regulator and to reduce the output voltage of the switching regulator when an abnormality is generated over the whole LED block. However, even if the ground fault is generated in any of the portions between the LEDs, therefore, the ground fault cannot be detected.

SUMMARY

The present disclosure addresses the foregoing issues and, among other things, relates to detecting a ground fault of multiple detecting target portions in portions to be connected to electrodes of semiconductor light sources. Various features and advantages will be readily apparent from the description, the accompanying drawings, and the claims.

A first aspect of the invention relates to a light emitting apparatus comprising a light source block having semiconductor light sources connected in series to each other, a resistor connected in parallel with any of the semiconductor light sources constituting the light source block and connected to two detecting target portions in portions linked to respective electrodes of the semiconductor light sources, and a ground fault detecting circuit connected to one of the two detecting target portions which is disposed on a ground potential side. The light source block has one of its terminals connected to a power supply and has the other terminal grounded. The ground fault detecting circuit is arranged to detect that a ground fault is generated in one of the two detecting target portions based on a voltage of the detecting target portion on the ground potential side.

When the ground fault is generated in one of the two detecting target portions connected to the respective electrodes of the semiconductor light sources, the voltage of the detecting target portion in which the ground fault is generated is changed into the ground voltage. By detecting the change of the voltage of the detecting target portion to have the ground potential through the ground fault detecting circuit, it is possible to detect that the ground fault is generated in one of the two detecting target portions linked to the respective electrodes of the semiconductor light sources. Moreover, the resistor is not provided in parallel with each of the semiconductor light sources. Instead, it is provided in only a specific one of the semiconductor light sources to be the detecting target to detect the ground fault. Therefore, it is possible to reduce the number of components as well as the cost compared with the case in which the resistor is provided in parallel with all of the semiconductor light sources.

In some implementations, other features may be included. For example, according to a second aspect of the invention, any of the semiconductor light sources to which the resistor is connected in parallel and the resistor are disposed in a different body member from a body member in which the other semiconductor light sources are disposed. A coating member is attached to a part of a circuit connecting the semiconductor light source to which the resistor is connected in parallel to the resistor.

When some of the semiconductor light sources with which the resistor is connected in parallel are disposed in the body member which is different from the body member in which the other semiconductor light sources are disposed, and when the generation of the ground fault is assumed due to be a distance from the power supply, the ground fault can be prevented from being generated in a part of the circuit connecting some of the semiconductor light sources to the resistor, even if the part of the same circuit is inserted into other components in the lighting device or a car body in an assembly. Even if the body member in which some of the semiconductor light sources and the resistor are disposed is movable, it is possible to prevent the ground fault from being generated in a part of the circuit connecting some of the semiconductor light sources to the resistor.

According to a third aspect, multiple resistors are provided corresponding to a node connected between the respective semiconductor light sources. The resistors constitute a resistance element for connecting the power supply to the ground fault detecting circuit, and are connected in series to each other through each of detecting target portions to be linked to electrodes of the respective semiconductor light sources.

When the ground fault is generated in any of the detecting target portions linked to the respective electrodes of the semiconductor light sources, the voltage of the detecting target portion in which the ground fault is generated is changed to have the ground potential, and the voltage of the detecting target portion connected to the ground fault detecting circuit also is changed to have the ground potential. By detecting the change in the voltage through the ground fault detecting circuit, it is possible to detect the generation of the ground fault in each detecting target portion linked to each of the electrodes of the semiconductor light sources.

Some implementations provide one or more of the following advantages. According to the first aspect, it is possible to detect that the ground fault is generated in one of the two detecting target portions in the portions linked to the respective electrodes of the semiconductor light sources.

According to the second aspect, it is possible to prevent the ground fault from being generated in a part of the circuit connecting some of the semiconductor light sources to which the resistor is connected in parallel to the resistor.

According to the third aspect, it is possible to detect that the ground fault is generated in any of the detecting target portions linked to the respective electrodes of the semiconductor light sources.

BRIEF DESCRIPTION OF THE DRAWINGS

FIG. 3 is a sectional view showing a state in which an LED is loaded onto a body member formed in a bracket, FIG. 4 is a waveform diagram for explaining a state of the voltage and current on an output terminal and a node.

DETAILED DESCRIPTION

Examples according to the invention are described below with reference to the drawings.

Figure 1:
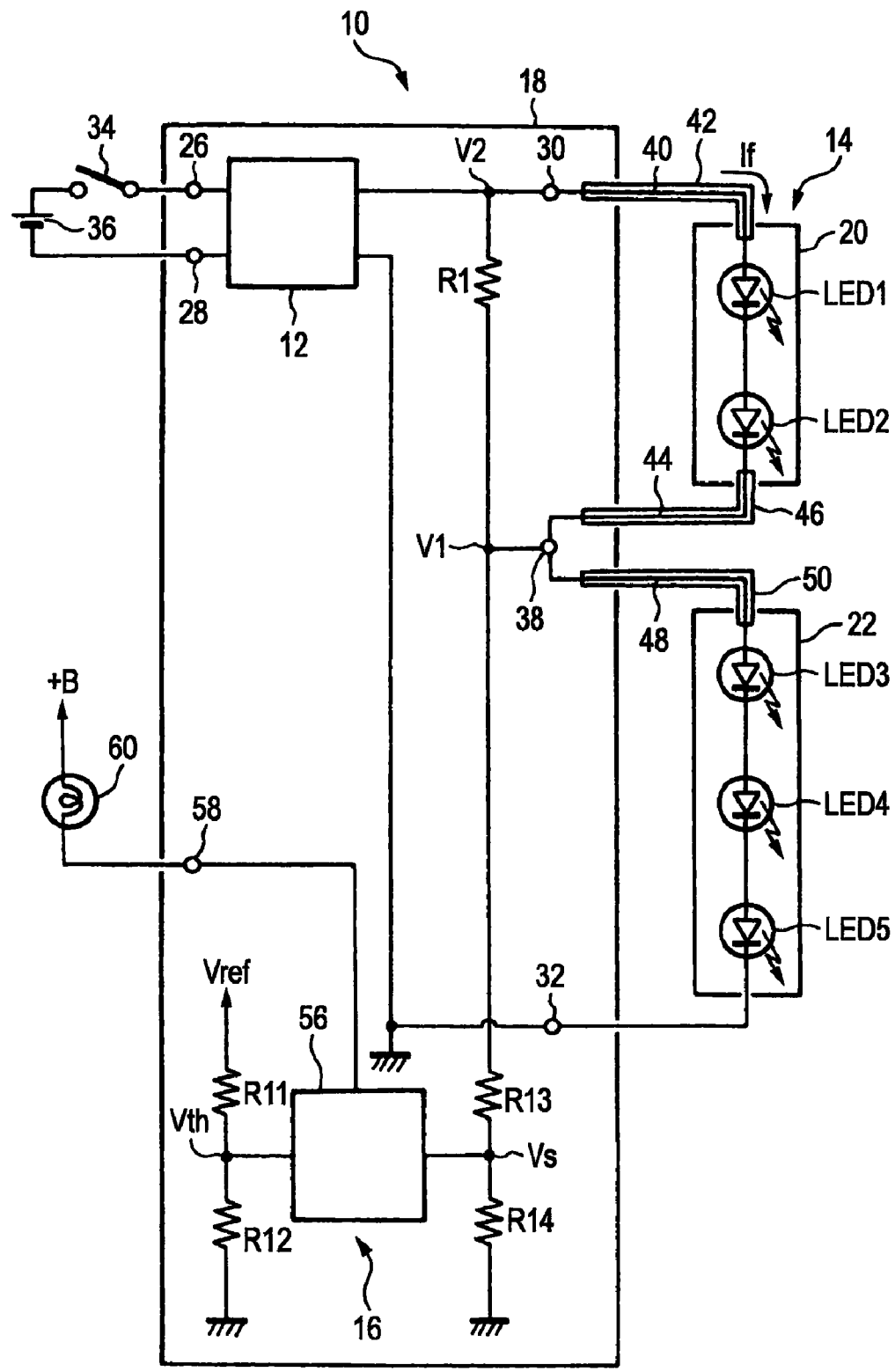
FIG. 1 is a block diagram showing a structure of a light emitting apparatus according to a first example of the invention.

As shown in FIG. 1, a light emitting apparatus 10 includes a DC/DC converter 12, a resistor R1, a light source block 14 and a ground fault detecting circuit 16. The DC/DC converter 12, the resistor R1 and the ground fault detecting circuit 16 are mounted on a circuit board 18. The light source block 14 includes LEDs 1, 2, 3, 4 and 5 connected in series to each other. The LEDs 1 and 2 are mounted on a body member 20 disposed in a lighting device, and the LEDs 3 to 5 are mounted on another body member 22 disposed in the lighting device.

Figure 2:
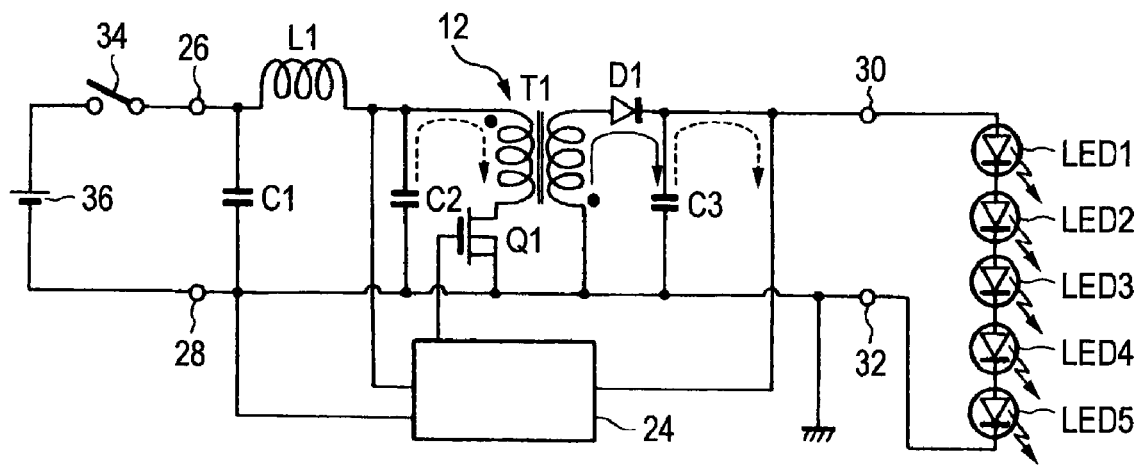
FIG. 2 is a diagram showing a circuit structure of a DC/DC converter.

As shown in FIG. 2, for example, the DC/DC converter 12 is implemented as a flyback-type switching regulator, which includes a coil L1, capacitors C1, C2 and C3, an NMOS transistor Q1, a transformer T1, a diode D1 and a control circuit 24. Both terminals of the capacitor C1 are connected to input terminals 26 and 28, and both terminals of the capacitor C3 are connected to output terminals 30 and 32. The input terminal 26 is connected to a positive terminal of an on-vehicle battery (a DC power supply) 36 through a switch 34, and the input terminal 28 is connected to a negative terminal of the on-vehicle battery 36 and is grounded. The output terminal 30 is connected to an anode of the LED 1 of the light source block 14, and the output terminal 32 is connected to a cathode of the LED 5 of the light source block 14.

The control circuit 24 is implemented as an IC (Integrated Circuit) and has the function of a calculator, for example. and the control circuit serves to generate a switching signal (a pulse signal) in accordance with a program to apply the generated switching signal (the pulse signal) as a control signal to the NMOS transistor Q1 and to control the switching operation of the NMOS transistor Q1 so that the voltage of the output terminal 30 is constant.

The coil L1 and the capacitors C1 and C2 constitute a noise filter of a type for removing switching noise of a power line and serve to smooth the DC voltage applied from the input terminal 26 and to apply the smoothed DC voltage to a primary side of the transformer T1. When the DC voltage is applied to the transformer T1, the NMOS transistor Q1 performs a switching operation in accordance with the switching signal. When the NMOS transistor Q1 is turned ON, for example, the smoothed DC voltage is stored as electromagnetic energy in a primary winding of the transformer T1. When the NMOS transistor Q1 is turned OFF, the stored electromagnetic energy is discharged from a secondary winding of the transformer T1. The discharged electromagnetic energy is rectified by the diode D1 and is smoothed through the capacitor C3 and is thereby converted into a DC voltage.

The DC power provided to the DC/DC converter 12 is converted into electromagnetic energy and then is converted into DC power, which is supplied to the LEDs 1 to 5. As the DC/DC converter 12, a boot-up type or a boot-down type can be used, in addition to the flyback-type switching regulator.

The light source block 14 has one of its terminals connected to the on-vehicle battery 36 through the output terminal 30, the DC/DC converter 12, the input terminal 26 and the switch 34, and has its other terminal grounded together with the output terminal 32. The LEDs 1 to 5 constituting the light source block 14 are inserted as a semiconductor light source into an output loop of the DC/DC converter 12.

The anode of the LED 1 is connected to the output terminal 30, and a node (a connecting terminal) 38 of the LEDs 2 and 3 is connected to one of the terminals of the resistor R1. A coating member 42 having an insulating property is attached to a lead wire 40 acting as a circuit for connecting the anode of the LED 1 to the output terminal 30. A coating member 46 having an insulating property is attached to a lead wire 44 acting as a circuit for connecting the node 38 to the cathode of the LED 2. A coating member 50 having an insulating property is mounted on a lead wire 48 acting as a circuit for connecting the node 38 to an anode of the LED 3.

The LEDs 1 and 2 are mounted on the body member 20 which is different from the body member 22 on which the LEDs 3 to 5 are mounted. The body members 20 and 22 are formed, through a vertical division in a bracket 150, as a unit attaching portion of the bracket 150 formed by a resin as shown, for example, in FIG. 3. Light emitted from each of the LEDs 1 and 2 mounted on the body member 20 is irradiated obliquely, forward and sideward from a vehicle through a reflector 52 shaped as a parabolic cylinder. Light emitted from each of the LEDs 3 to 5 mounted on the body member 22 is irradiated more obliquely, forward and sideward from the vehicle through a reflector 54 shaped as a parabolic cylinder.

In this case, the coating members 42, 46 and 50 are attached to the lead wires 40, 44 and 48, respectively. When arranging the body members 20 and 22 in a lighting device, it is possible to prevent the lead wires 40, 44 and 48 from generating a ground fault through other components in the lighting device or the car body even if the lead wires 40, 44 and 48 are inserted into the other components in the lighting device or the car body.

The light source block 14 is not restricted to a single type, but multiple light source blocks 14 may be connected in parallel with each other. Moreover, the light emitting diodes LEDs 1 to 5 can be implemented as light sources of various lighting devices for vehicles, for example, a headlamp, a stop and tail lamp, a fog lamp or a turn signal lamp.

The resistor R1 has one of its terminals connected to the output terminal 30 and has its other terminal connected to the node 38, and is connected in parallel with the LEDs 1 and 2. More specifically, in the portions connected to the electrodes of the LEDs 1 to 5, respectively, the lead wire 40 connecting the anode electrode of the LED 1 to the output terminal 30 and the lead wires 44 and 48 connecting the cathode electrode of the LED 2 to the anode electrode of the LED 3 through the node 38 are set to be detecting target portions. The resistor R1 has both terminals connected to the output terminal 30 and the node 38, which are linked to the detecting target portions.

The ground fault detecting circuit 16 includes a comparator 56 and resistors R1, R12, R13 and R14. One terminal side of the resistor R11 is connected to Vref, one terminal side of the resistor R12 is grounded, one terminal side of the resistor R13 is connected to the node 38 and the resistor R1, and one terminal side of the resistor R14 is grounded. A voltage obtained by dividing Vref through the resistors R11 and R12 is provided as a reference voltage Vth to the comparator 56, and a voltage obtained by dividing a voltage V1 of the reference point 38 through the resistors R13 and R14 is provided as a ground fault detecting voltage Vs to the comparator 56. The comparator 56 compares the ground fault detecting voltage Vs with the reference voltage Vth and provides as an output, from an output terminal 58, a voltage corresponding to the result of the comparison.

When the DC/DC converter 12 or the light source block 14 is set in a normal state, for example, the voltage V1 of the node 38 and the voltage V2 of the output terminal 30 have set voltage values, and a current If of each of the LEDs 1 to 5 has a set current value as shown at time t0 of FIG. 4. At this time, the ground fault detecting voltage Vs obtained by dividing the voltage V1 is higher than the reference voltage Vth, a voltage indicative of a normal state is provided from the output terminal 58 of the comparator 56, and a lamp 60 is set in an OFF state.

On the other hand, when the output terminal 30 generates the ground fault (i.e., is short-circuited), the voltage V1 in the node 38 is reduced to approximately 0V with a reduction in the voltage V2, and the current If of each of the LEDs 1 to 5 is raised rapidly as shown at time t1 of FIG. 4. At this time, the ground fault detecting voltage Vs obtained by dividing the voltage V1 is lower than the reference voltage Vth, a voltage indicative of an abnormal state is provided from the output terminal 58 of the comparator 56 and the lamp 60 is turned ON. By turning ON the lamp 60, it is possible to give a driver a notice that the ground fault is generated.

Also, when the ground fault is generated in portions other than the output terminal 30 (for example, portions excluding the output terminal 32 and linked to the node 38 (the cathode electrode of the LED 2, the anode electrode of the LED 3, and a portion between the LEDs 2 and 3 including the lead wires 44 and 48)), the voltage V1 in the node 38 is reduced to be lower than that in the normal state, and the ground fault detecting voltage Vs obtained by dividing the voltage V1 is lower than the reference voltage Vth. Therefore, when the ground fault is generated in the portions linked to the node 38, it can be detected reliably.

When the lead wire 40 is disconnected or broken so that the output terminal 30 is in an open state, both voltages V1 and V2 are higher than those in the normal state, and the current If of each of the LEDs 1 to 5 is 0 A as shown at time t2 of FIG. 4. At this time, the ground fault detecting voltage Vs obtained by dividing the voltage V1 is higher than the reference voltage Vth and is higher than that in the normal state. Therefore, the ground fault detecting circuit 16 does not detect that the output terminal 30 is in the open state, and the differentiation of an open ground fault can be thus carried out.

When it is necessary to detect that the output terminal 30 is in the open state, in an identical circuit structure to the ground fault detecting circuit 16, there is used, as the comparator 56, a comparator for providing a voltage indicative of the normal state if the voltage Vs obtained by dividing the voltage V1 is equal to or lower than the reference voltage Vth and providing a voltage indicative of the abnormal state if the voltage Vs obtained by dividing the voltage V1 is higher than the reference voltage Vth and the circuit is set to be an open detecting circuit. Such a circuit is connected to the node 38 in parallel with the ground fault detecting circuit 16. Consequently, it is possible to detect that the output terminal 30 is in the open state.

According to the example, the portion linked to the output terminal 30 or the node 38 is set to be the detecting target portion, the resistor R1 is connected to the output terminal 30 and the node 38, and the voltage V1 of the node 38 is monitored through the ground fault detecting circuit 16. When the ground fault detecting voltage Vs obtained by dividing the voltage V1 is lower than the reference voltage Vth, it is possible reliably to detect that the ground fault is generated in the detecting target portion linked to the output terminal 30 or the node 38 in the portions linked to the respective electrodes of the LEDs 1 to 5.

According to the example, the coating members 42, 46 and 50 are attached to the lead wires 40, 44 and 48, respectively. Even if the lead wires 40, 44 and 48 are inserted into other components in the lighting device or the car body in an assembly, it is possible to prevent the lead wires 40, 44 and 48 from generating a ground fault. Even if the body member 20 is movable, the lead wires 40, 44 and 48 can be prevented from generating a ground fault because the coating members 42, 46 and 50 are attached to the lead wires 40, 44 and 48, respectively.

According to the example, the ground fault is detected by providing the resistor R1 only in the specific LEDs 1 and 2 to be the detecting targets. As compared with the case in which the resistor is provided in parallel with the LEDs 1 to 5 respectively, therefore, it is possible to reduce the number of components as well as the cost.

Figure 5:
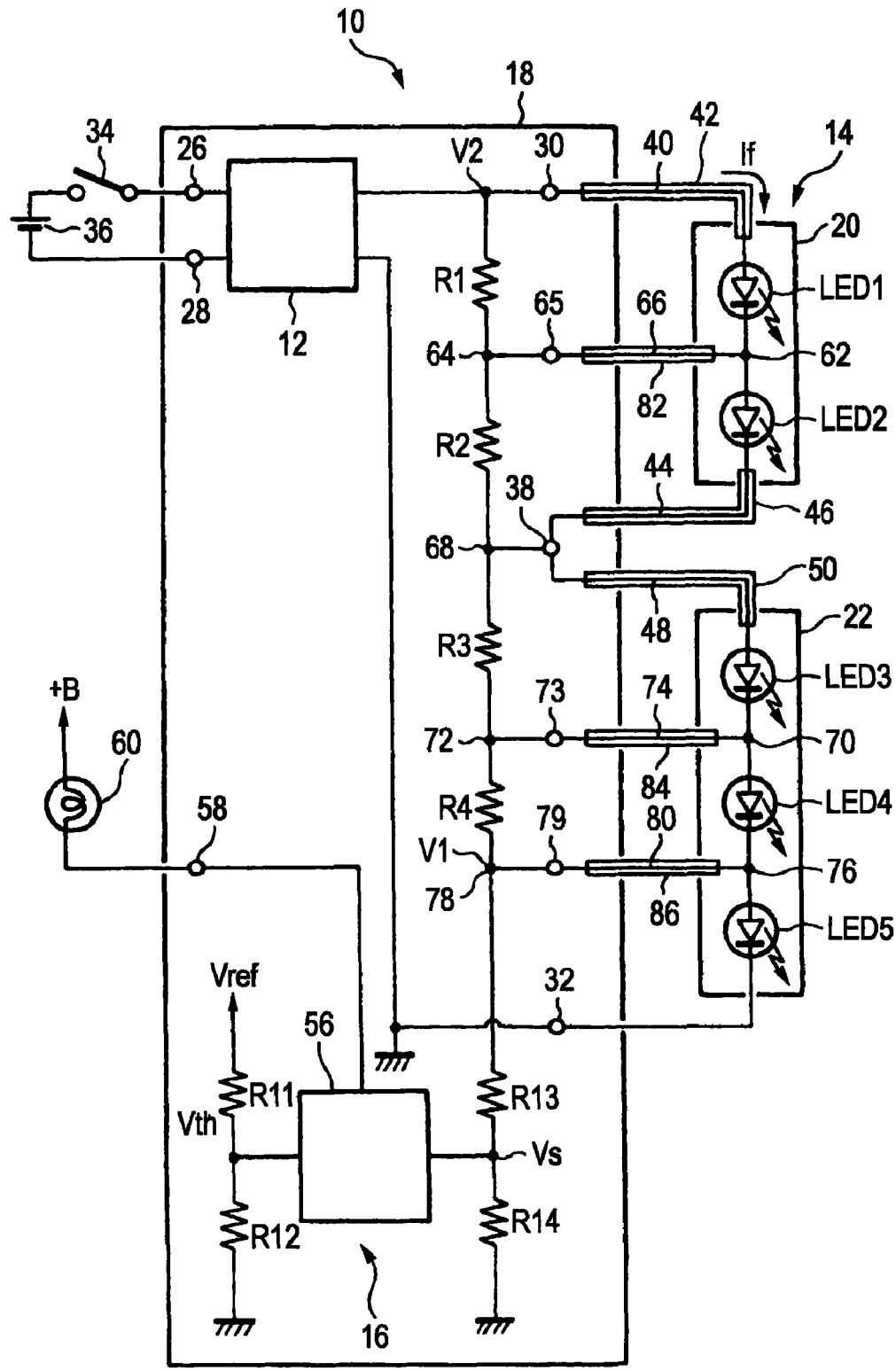
FIG. 5 is a block diagram showing a structure of a light emitting apparatus according to a second example of the invention.

Next, a second example according to the invention is described with reference to FIG. 5. In this example, multiple resistors are provided and correspond to nodes connected to LEDs 1 to 5. The resistors serve as resistance elements for connecting an output terminal 30 of a DC/DC converter 12 to a ground fault detecting circuit 16 through the respective nodes and are connected in series to each other in order to set portions linked to electrodes (anode and cathode electrodes) of the respective LEDs 1 to 5 (except for an electrode having a ground potential). The other structures are the same as those in the first example.

More specifically, a node 62 provided between the LEDs 1 and 2 and a node 64 provided between resistors R1 and R2 are connected to each other through a connecting terminal 65 and a lead wire 66. A node 38 provided between the LEDs 2 and 3 and a node 68 provided between the resistor R2 and a resistor R3 are connected to each other over a circuit board 18. A node 70 provided between the LEDs 3 and 4 and a node 72 provided between the resistor R3 and a resistor R4 are connected to each other through a connecting terminal 73 and a lead wire 74. A node 76 provided between the LEDs 4 and 5 and a node 78 provided between the resistor R4 and a resistor R13 are connected to each other through a connecting terminal 79 and a lead wire 80. Insulating coating members 82, 84 and 86 are attached to the lead wires 66, 74 and 80, respectively, in the same manner as lead wires 40, 44 and 48.

A voltage V1 of the node 78 is divided through the resistor R13 and a resistor R14 and is provided as an input to a comparator 56. The comparator 56 monitors the voltage V1 of the node 78 and turns ON a lamp 60 assuming that a ground fault is generated in any of the detecting target portions in the output terminal 30 and a light source block 14 when a ground fault detecting voltage Vs obtained by dividing the voltage V1 is reduced to be lower than a reference voltage Vth.

For example, when the ground fault is generated in any of the detecting target portions connected to the output terminal 30 or the nodes 62, 38, 70 and 76, the voltage V1 is reduced with the ground fault, and the ground fault detecting voltage Vs obtained by dividing the voltage V1 is reduced to be lower than the reference voltage Vth. By reducing the ground fault detecting voltage Vs to be lower than the reference voltage Vth, it is thus possible to detect the ground fault.

More specifically, even if the ground fault is generated in any of the detecting target portions connected to the output terminal 30 and the nodes 62, 38, 70 and 76 in the detecting target portions linked to the respective electrodes (anode and cathode electrodes) of the LEDs 1 to 5, the voltage V1 is reduced to be approximately 0V with the ground fault, and the ground fault detecting voltage Vs obtained by dividing the voltage V1 is lower than the reference voltage Vth. Therefore, it is possible to detect the ground fault reliably.

According to the example, even if the ground fault is generated in any of the detecting target portions connected to the output terminal 30 and the nodes 62, 38, 70 and 76 in the light source block 14 (the portions linked to the electrodes of the LEDs 1 to 5), it is possible to detect the ground fault reliably.

According to the example, coating members 42, 46 and 50 and the coating members 82, 84 and 86 are attached to the lead wires 40, 44, 48, 66, 74 and 80, respectively. Even if the lead wires 40, 44, 48, 66, 74 and 80 are inserted into other components in a lighting device or a car body in an assembly, it is possible to prevent the lead wires 40, 44, 48, 66, 74 and 80 from generating a ground fault.

Figure 6:
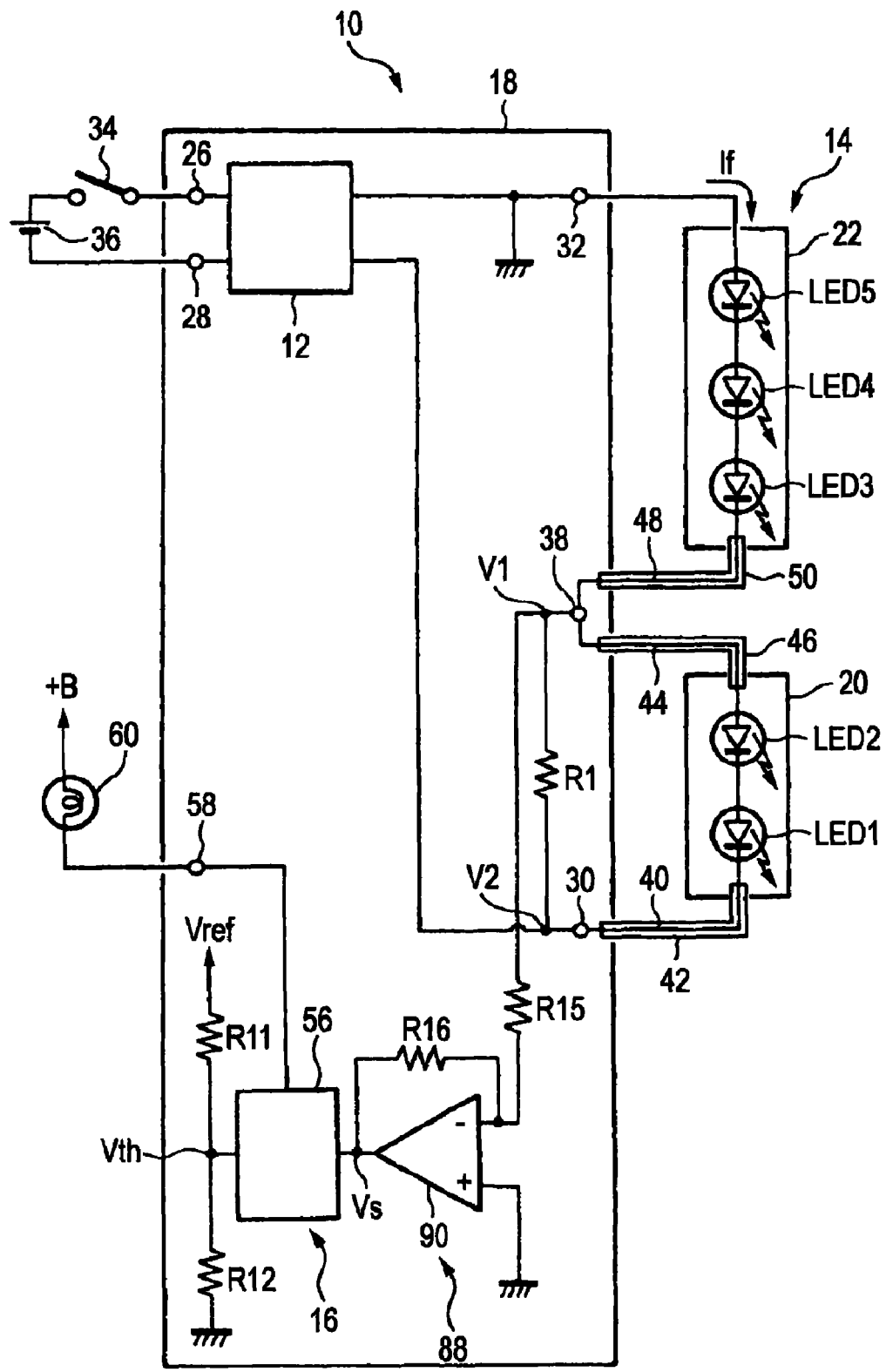
FIG. 6 is a block diagram showing a structure of a light emitting apparatus according to a third example of the invention.

Next, a third example according to the invention is described with reference to FIG. 6. In this example, a DC/DC converter 12 is implemented as a switching regulator for generating a negative voltage, an output terminal 32 is grounded, a negative voltage is provided from an output terminal 30 and the polarity of voltage V1 of node 38 is inverted. A ground fault detecting voltage Vs then is provided to a ground fault detecting circuit 16. The other structures are the same as those in the first example.

More specifically, the ground fault detecting circuit 16 includes a comparator 56 and resistors R11 and R12 and has an input terminal connected to an inverting circuit 88. The inverting circuit 88 includes an operational amplifier 90 and resistors R15 and R16. The operational amplifier 90 has a positive input terminal grounded and a negative input terminal connected to the node 38 through the resistor R15. The negative input terminal and an output terminal are connected to each other through the resistor R16. When the voltage V1 of the node 30 is provided to the positive input terminal through the resistor R15, the operational amplifier 90 inverts and amplifies the negative voltage and provides as an output the ground fault detecting voltage Vs having a positive polarity from the output terminal.

The comparator 56 of the ground fault detecting circuit 16 compares the ground fault detecting voltage Vs from the operational amplifier 90 with a reference voltage Vth and provides as an output a voltage corresponding to a result of the comparison from an output terminal 58.

For example, when the DC/DC converter 12 or a light source block 14 is set in a normal state, the ground fault detecting voltage Vs output from the operational amplifier 90 is higher than the reference voltage Vth, and a voltage indicative of the normal state is provided from the output terminal 58 of the comparator 56.

On the other hand, when a detecting target portion linked to the output terminal 30 or the node 38 generates a ground fault (i.e., is short-circuited), the voltage V1 in the node 38 is approximately 0V and the ground fault detecting voltage Vs is reduced to be lower than the reference voltage Vth. A voltage indicative of an abnormal state is applied from the output terminal 58 of the comparator 56, and the lamp 60 is thus turned ON. By turning ON the lamp 60, it is possible to give a driver a notice that the ground fault is generated.

According to the example, the voltage V1 of the node 38 is monitored through the ground fault detecting circuit 16 and it is possible reliably to detect that the ground fault is generated in any of the detecting target portions linked to the output terminal 30 and respective electrodes of LEDs 1 to 5 when the ground fault detecting voltage Vs obtained by inverting the voltage V1 is reduced to be lower than the reference voltage Vth.

It is also possible to apply, to the second example, the structure in which the DC/DC converter 12 is implemented as a switching regulator for generating the negative voltage, the output terminal 32 is grounded, the negative voltage is applied from the output terminal 30, and the polarity of the voltage V1 of the node 38 is inverted, and the voltage thus obtained is provided to the ground fault detecting circuit 16.

The foregoing examples describe a structure in which the DC/DC converter 12 is used as one of the elements of the DC power supply and the DC power applied from the battery 36 is supplied to the LEDs 1 to 5 through the DC/DC converter 12. In other examples, it is also possible to employ a structure in which the DC power applied from the battery 36 is directly supplied to the LEDs 1 to 5.

In the foregoing description of the first and second examples, the voltage V1 is divided through the resistors R13 and R14 and the voltage Vs obtained by the division is provided to the comparator 56. It is also possible to provide the voltage V1 directly depending on the structure of the comparator 56.

Other implementations are within the scope of the claims.

What is claim is:

1. A light emitting apparatus comprising:
    a light source block including a plurality of semiconductor light sources connected in series to each other, each of the semiconductor light sources including respective electrodes;
    a resistor connected in parallel with one or more of the semiconductor light sources constituting the light source block and connected to two detecting target portions in portions linked to the respective electrodes of the semiconductor light sources, wherein each of the detecting target portions has a negative voltage; and
    a ground fault detecting circuit connected to one of the two detecting target portions disposed on a ground potential side,
    wherein the light source block has one of its terminals connected to a power supply that generates a negative voltage and wherein the light source block has its other terminal grounded, and
    the ground fault detecting circuit is arranged to detect that a ground fault is generated in one of the two detecting target portions based on a voltage of the detecting target portion on the ground potential side.

2. The light emitting apparatus according to claim 1, wherein the resistor and the semiconductor light sources to which the resistor is connected in parallel are disposed in a body member which is different from a body member in which the other semiconductor light sources are disposed, and a coating member is attached to a part of a circuit connecting the resistor to the semiconductor light sources to which the resistor is connected in parallel.

3. The light emitting apparatus according to claim 1 including a plurality of resistors corresponding to a node connected between the respective semiconductor light sources and constituting a resistance element for connecting the power supply to the ground fault detecting circuit, wherein the plurality of resistors are connected in series to each other through each of the detecting target portions which are portions linked to electrodes of the respective semiconductor light sources.

* * * * *